US012110813B1

(12) United States Patent
Peila

(10) Patent No.: US 12,110,813 B1
(45) Date of Patent: Oct. 8, 2024

(54) CONCENTRIC CAMSHAFT FOR VARIABLE VALVE TIMING AND METHOD OF MANUFACTURING BY METAL ADDITIVE PROCESS AND DISINTEGRABLE BARRIER TO PRESERVE INTERSTITIAL VOID SPACES AND METHOD OF REMOVAL

(71) Applicant: Anthony John Peila, Greensburg, PA (US)

(72) Inventor: Anthony John Peila, Greensburg, PA (US)

(*) Notice: Subject to any disclaimer, the term of this patent is extended or adjusted under 35 U.S.C. 154(b) by 0 days.

(21) Appl. No.: 18/536,301

(22) Filed: Dec. 12, 2023

Related U.S. Application Data

(60) Provisional application No. 63/431,677, filed on Dec. 10, 2022.

(51) Int. Cl.
*F01L 1/047* (2006.01)
*F01L 1/344* (2006.01)
(Continued)

(52) U.S. Cl.
CPC ........... *F01L 1/047* (2013.01); *F01L 1/34413* (2013.01); *F02D 13/0219* (2013.01);
(Continued)

(58) Field of Classification Search
CPC ............... F01L 1/047; F01L 2001/0473; F01L 1/34413; F01L 1/46; F01L 2013/10;
(Continued)

(56) References Cited

U.S. PATENT DOCUMENTS

| | | | | |
|---|---|---|---|---|
| 6,832,586 B2 * | 12/2004 | Williams | ............ | F01L 13/0015 123/90.6 |
| 2009/0126662 A1 * | 5/2009 | Sellars | ...................... | F01L 1/02 123/90.17 |

(Continued)

FOREIGN PATENT DOCUMENTS

| | | | | |
|---|---|---|---|---|
| CN | 110695621 A * | 1/2020 | | |
| DE | 102011078818 A1 * | 1/2013 | .............. | F01L 1/047 |

(Continued)

*Primary Examiner* — Jorge L Leon, Jr.

(57) ABSTRACT

This invention relates generally to a camshaft having dual independent banks of cam lobes which are azimuthally adjustable one with respect to the other over a small angle so as to allow separate control of intake and exhaust valve opening and closing events. Such a coaxial camshaft allows relative changes in the lobe centerline angle, or LCA, to vary the amount of valve overlap during operation. An outer shaft member containing one bank of cam lobes houses an inner shaft containing another bank of cam lobes which protrude and extend radially outward through windows of omitted material in the outer shaft. The concentric shafts containing banks of cam lobes are each a single piece being produced in their final shapes, simultaneously, by metal additive manufacturing, or MAM. The shafts being initially produced concentrically require no individual assembly operation, and are constrained by one another, inextricably bound in the assembled configuration upon their being formed. Furthermore, as exemplified in the invention, the requisite spacing between the inner and outer shafts of the coaxial camshaft may be preserved free of metal by the pre-placement of barrier material, or by placement of a non-metal interlayer during manufacture, as exemplified herein which may subsequently be disintegrated by industrial ultrasonic process to facilitate its removal. In either case, the small annular space having been formed maintains the radial alignment between the inner and outer shafts to within acceptable tolerance, and
(Continued)

allows the flow of lubricating oil within the space during operation. Such a camshaft with the addition of a separate cam phasing mechanism may beneficially be fitted to engine blocks with a single traditional camshaft, which would otherwise be made from a single piece of material, with fixed LCA, thereby allowing older designs to be upgraded with fully universal Variable Valve Timing, or VVT.

19 Claims, 6 Drawing Sheets

(51) Int. Cl.
*F02D 13/02* (2006.01)
*F01L 1/46* (2006.01)
*F01L 13/00* (2006.01)

(52) U.S. Cl.
CPC ......... *F01L 2001/0473* (2013.01); *F01L 1/46* (2013.01); *F01L 2013/10* (2013.01); *F01L 2301/00* (2020.05); *F01L 2301/02* (2020.05); *F01L 2303/00* (2020.05); *F01L 2303/01* (2020.05); *F01L 2810/02* (2013.01); *F02D 13/0261* (2013.01)

(58) Field of Classification Search
CPC ............... F01L 2301/00; F01L 2301/02; F01L 2303/00; F01L 2303/01; F01L 2810/02; F02D 13/0219; F02D 13/0261
USPC ............................................ 123/90.17, 90.34
See application file for complete search history.

(56) References Cited

U.S. PATENT DOCUMENTS

| | | | | |
|---|---|---|---|---|
| 2016/0237863 | A1* | 8/2016 | Cecur | F01L 13/00 |
| 2017/0130615 | A1* | 5/2017 | Schacherer | F16H 53/025 |
| 2017/0204751 | A1* | 7/2017 | Meusel | F01L 1/34413 |
| 2018/0171833 | A1* | 6/2018 | Bayrakdar | F01L 1/3442 |

FOREIGN PATENT DOCUMENTS

| | | | | |
|---|---|---|---|---|
| DE | 102014213937 A1 * | 1/2016 | | F01L 1/047 |
| WO | WO-03078802 A1 * | 9/2003 | | F01L 1/34 |
| WO | WO-2012032634 A1 * | 3/2012 | | F01L 1/047 |

* cited by examiner

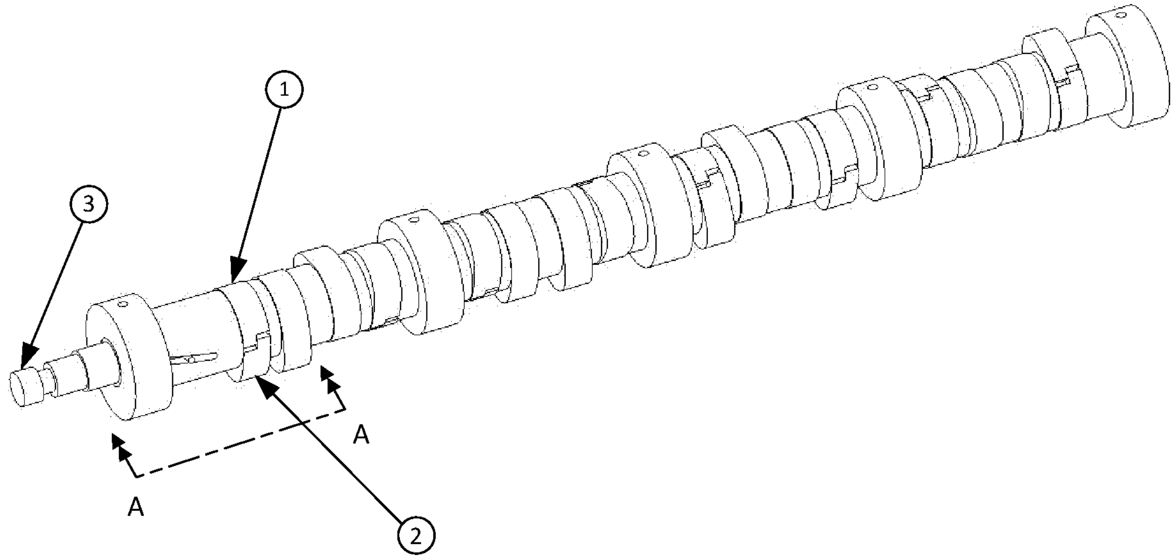
*Figure 1* – Isometric View

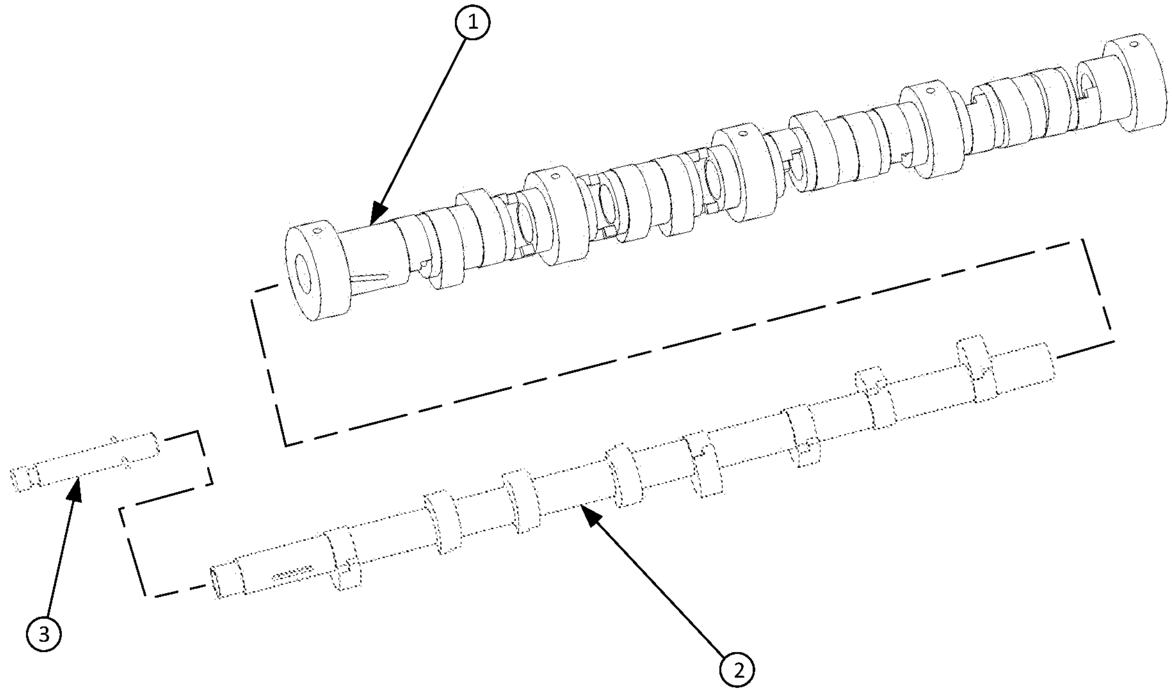
*Figure 2* – Exploded View

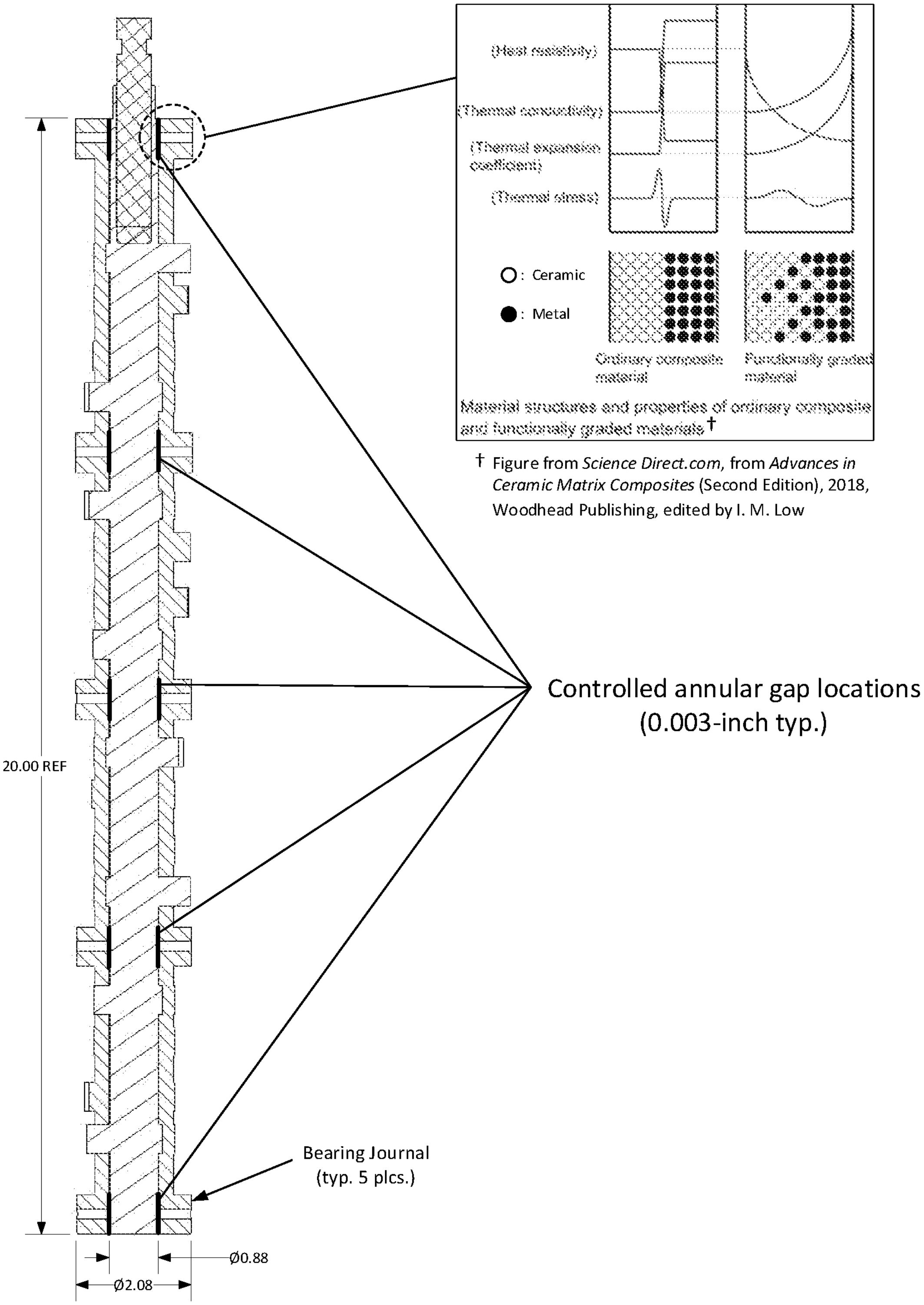
† Figure from *Science Direct.com*, from *Advances in Ceramic Matrix Composites* (Second Edition), 2018, Woodhead Publishing, edited by I. M. Low
*Figure 3* – Cross Section

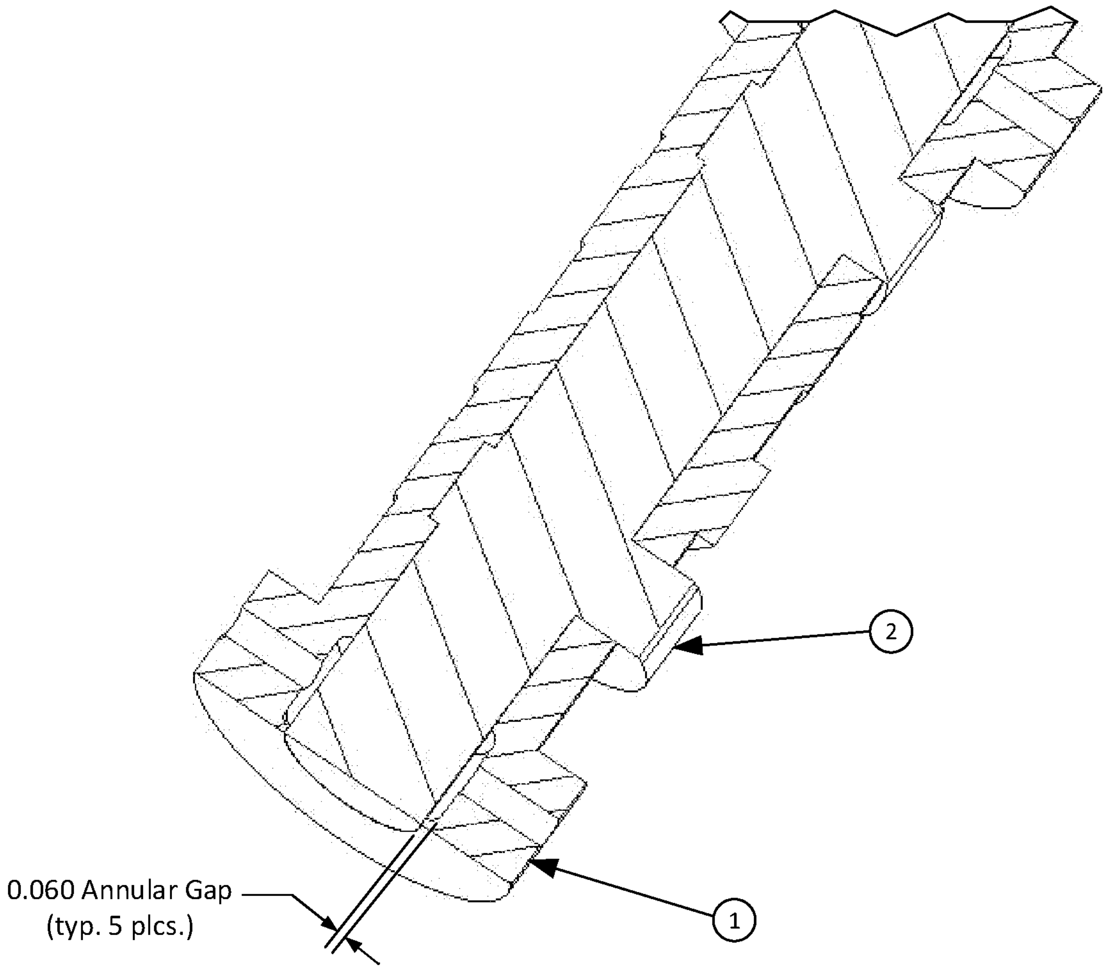
*Figure 4* - Cross Section - Enlarged

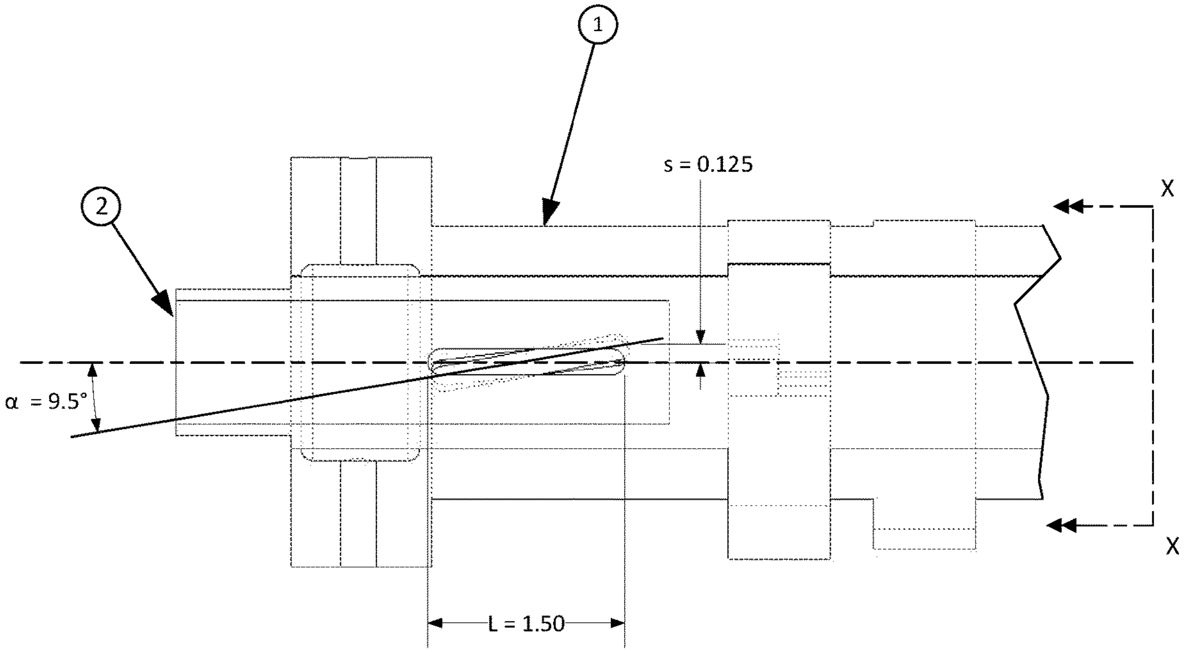
Figure 5 - View A - A

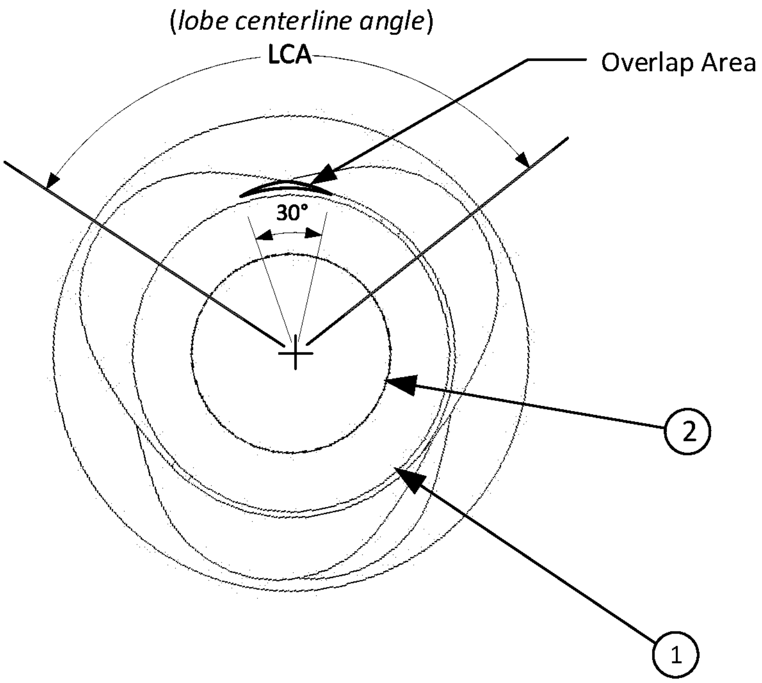
*Figure 6* - View X - X

CONCENTRIC CAMSHAFT FOR VARIABLE VALVE TIMING AND METHOD OF MANUFACTURING BY METAL ADDITIVE PROCESS AND DISINTEGRABLE BARRIER TO PRESERVE INTERSTITIAL VOID SPACES AND METHOD OF REMOVAL

BACKGROUND a. Technical Field

This invention relates generally to automotive internal combustion engines, in particular high performance engines, whereby a single coaxial camshaft comprised of two moveable sub-parts constituting dual banks of cam lobes enables azimuthal angular adjustment between said banks. A camshaft so comprised allows the relative timing between intake and exhaust opening and closing events to be controlled, thereby permitting the amount of valve overlap to be varied with engine speed in order to maximize engine output. In connection with a separate mechanism which allows the base angle of the entire camshaft to be adjusted relative to the engine crankshaft angle, valve timing in regards to the position of the pistons may further be adjusted such that universal variable valve timing is achieved with a single camshaft which is comprised of two banks of independently positionable intake and exhaust cam lobes. The construction of such a camshaft must be such that the independent shafts, one residing within the other, and also containing the axially interrupted, and radially projecting, cam lobes for both the intake and exhaust banks, may also act as a single traditional camshaft, which would otherwise be comprised of completely contiguous material, mainly a central shaft with intake and exhaust cam lobes rigidly fixed thereon. In order to maximize the utility of the invention comprising dual moveable banks of cam lobes, the assemblage of said shafts containing the cam lobes should fit within the space currently reserved for the traditional camshaft of single-piece construction, which is further constrained within the confines of the engine block of a push rod style engine. The limiting internal envelope diameter is that which is required to permit installation of the camshaft within the inside diameters of the camshaft radial bearing housing supports. Thus, sufficient space is not available for the camshaft envisioned by the invention to exhibit an overall space envelop of design which is larger than the traditional camshaft of solid construction. This being the case, sufficient interior clearances within the camshaft may not be obtained to permit mechanically assembling individual parts comprising the dual bank camshaft while also maintaining sufficient rigidity. Therefore, the camshaft exemplified herein is constructed by means which allows the dual banks of cam lobes and their corresponding shafts, to be formed concurrently during manufacture via a process which is additive in nature, versus traditional subtractive manufacturing means followed by mechanical assembly of the component parts. The arrangement resulting from said additive manufacturing thus comprises a camshaft of two concentric shafts which are commingled sub-parts, inextricably bound together during manufacture, and are neither assembled together nor bound together by mechanical means designed for this purpose. Ideally, the clearances between said sub-parts of the camshaft are miniscule in size and purposefully limited to maintain the required radial runout tolerance of the camshaft lobes within an acceptable range, but are sufficiently large enough to permit relative rotational movement between the inner and outer lobe containing shafts.

b. Background Information

Background information is for informational purposes only and does not necessarily admit that subsequently mentioned information and publications are prior art. The camshaft intake and exhaust activation profiles in a single camshaft engine, may not be changed relative to one another but are fixed by the fact that a single camshaft is conventionally made up of a single piece of contiguous material which permanently fixes the azimuthal angle between the respective banks of intake and exhaust cam lobes relative to one another. This angle which separates the intake and exhaust lobe is known as the lobe centerline angle, or LCA. Should a single camshaft be constructed whereby the intake and exhaust cam lobe banks are azimuthally adjustable relative to each other, i.e., variable LCA, key performance characteristics of the engine may be optimized by controlling the amount of valve overlap, i.e., period where both intake and exhaust valves are opened concurrently. Much prior art deals with the benefits of valve overlap to the volumetric efficiency of the engine operation at higher engine speed thereby maximizing power output, which is not so at lower engine speed where no valve overlap may be beneficial for developing optimal torque output, fuel economy, and smoothness of operation. Therefore, it is desirable to have the ability to selectively control the amount of valve overlap, by varying the LCA, in terms of engine speed and operating condition.

Early in automotive engine design the advantages to controlling the relative intake and exhaust cam lobe positions was recognized for improvements in smoothness of engine operation. Early prior art as in U.S. Pat. No. 1,527,456 dated Feb. 24, 1925, exemplifies a means to azimuthally adjust a single cam lobe comprised of two independent concentric parts, one hollow outer lobe housing an inner solid lobe connected to separate concentric shafts, whereby the assemblage acting on a single valve may effectuate variable valve opening duration, in such case. Later, the concept of coaxially arranged camshafts was practiced to control multiple valves and the timing relationship between the intake and exhaust events, as in U.S. Pat. No. 5,664,463, dated Sep. 9, 1997, whereby concentrically arranged cam lobes which are axially spaced and connected to concentric housings are azimuthally adjustable relative to each other, as with the invention herein, to control intake and exhaust valve timing relative to one another. Given the manufacturing difficulties associated with such concentric camshafts, modern engines with variable valve timing took advantage of multiple camshafts in the overhead camshaft configuration, which is advantageous to individually controlling each camshaft which is devoted to either a bank of intake or exhaust valves, but disadvantageous in the number of camshafts and operating mechanisms required for such a configuration. Indeed, U.S. Pat. No. 7,228,829 B1 dated June, 2007 serves as a compendium of prior art culminating in an embodiment which utilizes multiple overhead camshafts to accomplish continuously variable valve timing to capture all the benefits thereof, clearly described therein, chief among them is increasing the valve overlap angle with increasing engine rpm. As modern automotive engines have grown in number of cylinders from one to 4, 6, 8, and 10, the embodiment of a coaxial camshaft became more complex to manufacture as each cylinder has at least 2 valves, and high performance engines may have four or five valves per cylinder, requiring a similar increase in number of cam lobes.

However, as described in an internet article entitled Viper V10 Introduces Cam-in-Cam Variable Valve Timing, dated Aug. 23, 2007, it is stated that Chrysler Corporation releases the first production pushrod-valve engine with truly variable valve timing, or VVT. As in U.S. Pub. No. 2010/0132640 A1, dated Jun. 3, 2010, this embodiment exemplifies a modern performance coaxial camshaft, housed in the engine block, as opposed to utilizing multiple overhead camshafts to achieve VVT. This cam is manufactured by Mahle Corporation and is called the CamInCam® camshaft. This concept, and the beneficial performance gains that VVT brings to performance engines is thoroughly described in an article entitled Variable Valve Timing—The Next Phase, Hot Rod Magazine, Marlan Davis—author, dated Jul. 10, 2009, available at this link, https://www.motortrend.com/how-to/hrdp-0908-variable-valve-timing/. The advances in technology allowing engine architectures fitted with VVT to evolve from multiple overhead style cam engines to this single concentric cam-in-cam design is thoroughly described therein, with multiple charts, diagrams, and photographs illustrating the operation of VVT accomplished via single concentric camshaft.

In that sense, the operation of the invention herein is not new or novel; however, in all prior art the concentric camshaft comprises an assembly of many individual component parts which are arranged and held together by traditional mechanical means in a multi-part assemblage, as in U.S. Pat. No. 5,664,463, dated Sep. 9, 1997, and U.S. Pat. No. 7,610,890, dated Nov. 3, 2009. These camshaft assemblies in said prior art distinguish themselves as their design must allow relatively large assembly clearances for passage of the parts into, around, and along the other parts being so arranged during post-manufacturing assembly operations such that internal portions are housed within outer portions which surround or otherwise encapsulate the inner pieces. In many cases the outer camshaft is of tubular or hollow construction to allow large internal voids for passage of said parts to facilitate assembly. The individual parts each being placed within or around the other parts must then be fixed in place by additional parts such as shear pins, keys, and splines or be bound together by pressing, shrinking, or welding. Once assembled, such arrangements may be disassembled by following a process which is merely the reverse of the assembly process.

Whereas, this invention comprises a consolidated camshaft containing only two primary sub-parts constituting independent shafts containing separate banks of cam lobes, one housed inextricably within the other, where clearances between the sub-parts are much too small to allow passage, fitting, or assemblage of these sub-parts during post-manufacture assembling of said shafts. Such a construction where the two parts are physically commingled, cannot be accomplished by traditional manufacturing methods based on machining away material with a subtractive process such as milling, turning, or cutting, and whereby individual component parts are manufactured separately by the respective machining operations and brought together later for assembly. The invention so comprised may only be produced by metal additive manufacturing process, or MAM, whereby the independently moveable concentric shafts are built concurrently, one within the other, resulting in a coaxially arranged intake bank and exhaust bank of cam lobes azimuthally rotatable relative to one another, within the allotted clearances, but whereby said banks are inextricably bound together as in a solid single-piece camshaft which would otherwise be comprised of one piece of contiguous material. The interstitial void spaces separating the two sub-parts of this coaxial camshaft are only sufficient to allow relative angular motion between banks of cam lobes about a common axis, and as dictated by the current state of the MAM technology. Further, neither bank of lobes is housed radially entirely within or without the other bank as protuberances of one bank protrude outboard of the other and protuberances of the other bank protrude inboard of the other thereby making disassociation of one bank relative to the other by sliding one axially relative to the other not possible. Neither may the central shaft, which comprises one of the banks of cam lobes be shifted radially through the small radial clearances to allow assembly or disassembly. Said radial clearances are of an order of magnitude that is many times smaller than the component protuberances thereby preventing passage of one relative to the other, and said clearances are designed to such a minute scale only as sufficient to allow rotational motion of the one shaft relative to the other during operation, and furthermore to allow passage of lubricating oil within the interstitial space to accomplish thin film lubrication during operation, the lubricating oil being necessary to allow smooth operation and sustained part longevity.

Veritably, the designing of the void spaces within and around the solid material deposited by the MAM process will drive the actual design so as to be technologically feasible by the current state of available MAM processes. In a technically feasible process of Directed Energy Deposition, or DED, the powder bed fusion process, which entails a matrix of particles that are melted or sintered into a plurality of laser or electron beam deposited layers which are themselves on the order of between 5 μm and 60 μm (0.0002 inch to 0.0024 inch), so too the coaxial bodies comprising the inner and outer shafts may be deposited with finely discretized regions of non-metallic particles to occupy the intended annular and axial clearance spaces between said bodies of base material; the intervening non-metallic regions are to be removed later, thereby maintaining the metal base material unattached and free to move relative to one another. As exemplified in U.S. Pat. No. 11,621,544 B1, dated Apr. 4, 2023, the laser metal deposition process is utilized to form complex geometry of the parts while carefully controlling the distinct regions of differentiated material as in a composite part construction. In this manner, the required radial and axial void spaces between inner and outer camshafts may be formed by differentiating a material in these spaces which may be removed during post-manufacturing processing. An embodiment of this invention will be exemplified thusly.

Another object of this invention, a mechanism for effectuating adjustment of the azimuthal angular orientating between the coaxial intake and exhaust banks of cam lobes is required to control intake versus exhaust timing and thereby control the amount of valve overlap occurring between said banks which occurs during the period of time following initial opening of the intake valves and complete closure of the exhaust valves. The occurrence and duration of said overlap has great efficiency benefits to the maximization of the density of the incoming fuel and air charge so as to maximize engine power output. And, although not an object of this invention, by driving said camshaft in its entirety with an external variable camshaft phasing device, one such mechanism being embodied as exemplified by U.S. Pat. No. 11,352,918 dated Jun. 7, 2022, the base angular timing of the entire camshaft may be controlled relative to the engine's crankshaft such that the overall timing of the occurrence of the overlap period may be controlled relative to the piston positions. Thusly, having complete variability of both camshaft base angle and relative angle between intake and exhaust banks, universal variable valve timing is achieved with this invention. Much prior art deals with the merits of universal variable valve timing, more commonly referred to as VVT, to the performance characteristics of the engine; however, conventional VVT systems are normally embodied in engines with overhead camshaft configurations, and containing multiple camshafts, each of solid single-piece construction and separately dedicated to either intake or exhaust valves. Thus, VVT by means of said prior art is necessarily not conducive to engine architectures containing only a single camshaft, particularly when said camshaft is housed within the engine block versus in the cylinder heads, and whereby said single camshaft activates the respective intake and exhaust valves by raising and lowering push rods connected through camshaft followers and rocker arms to the respective valves located in the cylinder heads, as in this embodiment. Thereby, this invention is novel in both the design application and method of manufacture for constructing said two-part coaxial camshaft, and further by facilitating and effectuating VVT by a single camshaft housed within the block of a pushrod style engine of traditional design, further allowing the benefits of modern VVT control in a conventional, but much less complex and generally more reliable engine configuration. Furthermore, the compact construction of this exemplification of the invention permits direct back-fitting of the camshaft into older non-VVT cam-in-the-block style engines. The benefits of said layout containing only a single camshaft housed within the engine block, whereby not being comprised of a multi-camshaft engine with camshafts mounted overhead in the cylinder heads, also allows for a more compact engine configuration due to the reduction of total part count, and also allowing for a smaller V-angle between the left and right cylinder banks, thereby reducing the overall height and width of the engine.

Object or Objects

A coaxial camshaft containing moveable banks of intake and exhaust cam lobes which may be fitted to an engine of traditional single-camshaft design and a method for control of azimuthally adjusting the angle between said banks of cam lobes, known as the lobe centerline angle, or LCA, provides the ability to vary the amount of intake and exhaust valve overlap in the operation of the engine. Further, fitting of the engine with external means of adjusting the base angle of the camshaft relative to the crankshaft provides variable control of the overall advance or retard angle of the camshaft relative to the pistons; these modes acting together are known as variable valve timing, or VVT. The camshaft so exemplified herein comprises two primary components, inner and outer shafts, coaxially disposing the respective banks of intake and exhaust cam lobes, which may only be constructed by means of additive manufacturing process whereby the dual independent banks of cam lobes and integrally connected shafts are constructed concurrently, one being housed within the other. Clearances between the inner and outer shafts upon which said independent banks of cam lobes are formed are minimized and are of an order of magnitude which is so small as to prohibit assembling, or disassembling, of such coaxial shafts by traditional mechanical means. Said clearances are minimized to maintain radial positioning of the cam banks and to allow passage of a thin film of lubricating oil within and around the shafts as necessary for smooth operation and longevity of the parts.

SUMMARY OF INVENTION

The invention comprises an inner shaft of contiguous material containing a bank of cam lobes permanently affixed thereon. Arranged concentrically with said inner shaft comprises an outer hollow shaft of contiguous material containing another bank of cam lobes permanently affixed thereon. The inner shaft being entirely contained within the outer shaft, but also having protuberances, as in cam lobes, which project radially outward beyond the inner regions of the outer shaft, the inner shaft may not be inserted or otherwise assembled within the outer shaft. Therefore, a means of manufacturing the inner shaft within the outer shaft is required, such as may be achieved by generating both inner and outer shafts concurrently by the process of metal additive manufacturing, or MAM, versus subtractive manufacturing which is practiced in the manufacture of camshafts comprising all prior art. A plunger is also contained within the confines of the inner shaft and is inextricably bound there in a similar manner of additive manufacturing where said plunger also has protuberances, as in cylindrical cross pin projections which extend radially outward through mating slots in both the inner and outer shafts. The purpose of the plunger will be discussed later as it pertains to the method of use of the invention.

Having constructed the inner shaft housed within the inside diameter of the outer shaft, but also having protuberances that extend radially outward beyond the walls of the outer shaft, and the plunger which is housed within the inside diameter of the inner shaft, but also having protuberances that extend radially outward beyond the walls of the inner and outer shafts, the assemblage is permanently conjoined and may not be separated into its three sub-component parts by ordinary mechanical disassembly. Only destructive means could be applied to separate the assemblage into its sub-component parts rendering the components useless. Moreover, the interstitial void spaces to be preserved between and among the sub-component parts allows relative azimuthal rotation of the inner shaft relative to the outer shaft; the plunger may translate axially relative to the inner shaft and both axially and azimuthally relative to the outer shaft owing to the configuration of the slots provided in the walls of both inner and outer shafts within which the plunger contains cross pin protuberances which ride in said slots simultaneously. By axial movement of the plunger, and said cross pin protuberances translating axially within the axial slots of the inner shaft, and at the same time following the helical slots of the outer shaft, or vice versa, a reactive moment is created between the shafts causing azimuthal rotation of the outer shaft relative to the inner shaft. A suitable mechanism which is not an object of this invention, may be fitted to the plunger causing axial displacements thereof, thus causing relative angular displacement of the intake lobes contained on the inner shaft to the exhaust lobes contained on the outer shaft, thereby causing a change in the lobe centerline angle, or LCA.

BRIEF DESCRIPTION OF THE DRAWINGS

The invention is explained in greater detail below with reference to the accompanying drawings.

FIG. 1—Isometric View of Coaxial Camshaft in the As-Manufactured Condition

FIG. 2—Exploded View of Coaxial Camshaft Sub-Component Parts

FIG. 3—Cross Section Showing Interstitial Annular Gap locations between Inner and Outer Shafts and Detail of Composite and Functionally Graded Material (FGM)

FIG. 4—Cross Section Showing Enlarged Annular Gap for Post-Placed Bearing Material FIG. 5—View A-A Showing Section View of Helical and Straight Slots FIG. 6—View X-X Showing Section View of Cam Lobes and Overlap Area

DESCRIPTION OF EXEMPLIFICATION OR EXEMPLIFICATIONS

| Figure Item Reference Numerals: | |
|---|---|
| 1 | Outer shaft containing exhaust cam lobes |
| 2 | Inner shaft containing intake cam lobes |
| 3 | Actuation plunger |

FIG. 1 shows the arrangement of the inner and outer shafts containing cam lobes in the as-manufactured configuration; each sub-component is labeled thereon. The cam lobes contained on either the outer hollow shaft, item 1, or inner solid shaft, item 2, may be either the intake or exhaust cam lobes as long as the intake or exhaust bank of cam lobes is entirely contained on one shaft or the other, and that the banks of cam lobes act independently and are azimuthally adjustable one to the other over an angle normally less than forty five degrees. As further shown in exploded view, FIG. 2, the outer hollow shaft portion must contain windows where material is omitted so as to allow the cam lobes which are affixed to the inner shaft to project radially through and protrude beyond the diameter of the outer hollow shaft. Further, there is a small interstitial space residing between portions of the outer diameter of the inner shaft and inner diameter of the outer shaft. Said gap provides radial clearance between the inner and outer shafts so as to allow rotational movement between shafts but also constrain the shafts concentrically within the limits of this clearance. Therefore, the size of said gap being important to maintain the radial alignment of the shafts, the clearance must be kept to a very small size on the order of a few thousandths of an inch radially. As shown in FIG. 3, the small radial gap regions may be selectively placed at intervals along the length of the assemblage as to ease manufacture. In the preferred exemplification the carefully controlled radial annular gaps are located at the locations of the outer main camshaft bearing journal diameters indicated on FIG. 3. The radial gap at other adjacent regions may be enlarged so as to be freely formed by the additive manufacturing process, having no great consequence on the operation of the device.

As described above, the coaxial camshaft so envisioned being constructed by additive manufacturing process, the controlled annular gaps so described are formed by omitting material in this area during the metal deposition process of manufacture. A means of preserving this space void of metal is required and is further exemplified herein by selective placement of a non-metallic material in this region. The material in the controlled gap region may be a result of pre-placement of a temporary non-metallic barrier such as an industrial ceramic which is not consumed in the metallic base material. Alternately, as with the powder bed fusion process of additive manufacture, discretization of the barrier material in the controlled gap region may be accomplished concurrently during placement of the build layers, resulting in a finished part which is known as a composite. In fact, the feasibility of such a method is demonstrated by the use of additive manufacturing to construct Functionally Graded Materials, or FGMs, which include a transitional region of the material from that of a base metal to a fully ceramic filler material, and then back to base metal; the thickness of the transitional graded region, or interlayer of material, may range from microns to millimeters, as thoroughly described by Science Direct, in an article titled Functionally Graded Material, from Advances in Ceramic Matrix Composites (Second Edition) 2018, available at https://www.sciencedirect.com/topics/materials-science/functionally-graded-material. Said material will also be captured within the confines of the finished assembly and requires a specific removal process discussed further herein.

FIGS. 1 through 3 illustrate an axially aligned plunger which is housed within the inner diameter of the inner lobe-containing shaft whose purpose is to effectuate azimuthal adjustment of the inner and outer lobe-containing shafts so as to enable variable valve timing by adjusting the azimuthal angle between said inner and outer shafts. The plunger, item 3, is formed with cross pin projections which protrude radially outward from the body of the plunger through mating slots in the outer and inner shafts, items 1 and 2, respectively. Azimuthal adjustments between the shafts are caused by axial displacement of the plunger by a suitable external mechanism. The plunger is guided by axially aligned slots provided through the wall of the inner shaft which are parallel to the axis of the inner shaft, as shown in FIG. 5. The portions of the cross pin which project radially outward through helical slots provided in the wall of the outer shaft, bear against the surfaces of the helical slots therein, also shown in FIG. 5; upon axial displacement of the plunger, whereby the plunger is guided in fixed azimuthal alignment in the straight slots of the inner shaft, but where the reactive force of the cross pin projections bearing against the helical slots of the outer shaft causes rotation of the outer shaft relative to the inner shaft thereby accomplishing relative rotation between the intake and exhaust lobes. The azimuthal angle between intake and exhaust lobes is referenced from the center axes of the lobes, as shown in FIG. 6, this angle is otherwise known as the lobe centerline angle, or LCA.

Exemplifications of the invention so illustrated may derive from the method of construction presented herein by someone skilled in the art and with knowledge of the method so described, and/or by other means of manufacture, such that the scope of the invention shall not be limited to exemplifications comprised herein but shall comprise any such multiple-part coaxial camshaft which by mechanical means effectuates relative adjustment of the azimuthal LCA between the banks of intake and exhaust cam lobes contained separately on said coaxial shafts, which are individually themselves a single piece of contiguous material, but are free to move circumferentially relative to one another, thereby accomplishing variable overlap between intake and exhaust valve events.

The preferred exemplification having an inner cam lobe containing shaft of single-piece construction which is housed within a tightly fitting outer cam lobe containing shaft, which is also of single-piece construction. Purposefully placed annular void spaces forming tightly controlled radial gaps are axially spaced along the length of the camshaft, as shown in FIG. 3, which are reserved free of metallic material during the additive manufacturing process, and are maintained radially as small as practicably possible during manufacture resulting in the radial alignment between the shafts being held within acceptable tolerances. Further, during operation of the camshaft, the annular gap being of sufficient width as to be filled by lubricating oil circulating through the engine thus ensuring smooth movement between the coaxial shafts. Yet further, radial passages which are similarly left void of material are in communication with the interstitial annular gaps to permit the flow of oil from the exterior bearing surfaces of the outer shaft into these annular gaps residing between the inner and outer shafts. A pressurized source of lubricating oil is normally available within the engine as is provided for the purpose of lubricating the main journal bearings of the camshaft itself which is contained and supported within bearing supports of the engine block in the traditional manner. Some of this oil flow which exists around the camshaft main bearing journals may be diverted through said passages into the interior of the coaxial camshaft for said purpose of filling the annular gap.

One feature or aspect of an exemplification of this invention is believed at the time of the filing of this patent application to possibly reside broadly in the use of a non-consumable barrier material which may be pre-placed in the regions reserved for the desired annular gaps so as to prevent base metal from being deposited there, thereby reserving the space for said gaps, and allowing the radial width of the gap to be carefully controlled; upon completion of manufacturing, the pre-placed or deposited barrier material requires removal to create the annular void space. This method, described further below, is believed to be required only due to the limitations of the metal additive manufacturing process whereby free-formed gaps between discrete surfaces of adjacent metal parts are necessarily much larger due to process limitations than the desired several thousandths of an inch required by this application. As currently understood, the resolution of the metal deposition process to reserve free-formed gaps during placement of the material is on the order of hundredths of an inch, thus being much coarser than required to achieve the target gap size of thousandths of an inch without purposefully pre-placing or constructing an intervening material to physically separate the parts where the gaps are to reside.

More summarily and generically, a method and material which may be placed as a barrier to metal deposition which is not obliterated by the base material which is deposited around said barrier by the metal additive manufacturing process. Said barrier material is believed at the time of the filing of this patent application to be exemplified in at least one example by the use of industrial ceramics such as carbides or metal oxides which are capable of withstanding the direct energy deposition method of manufacture without themselves being melted, consumed, or agglomerated in the base material. The pre-placed ceramic barrier will maintain its initial form and upon completion of construction be contained within and between the component parts of the assemblage, and require removal after completion of construction of the parts. Said pre-placed barrier material of ceramic construction may be obtained and created in any of several available manufacturing processes known to the field of industrial ceramics. This being the case, the ceramic barrier may be constructed via conventional raw material processing including machining and forming, then sintering, followed by diamond grinding, within the current capabilities of these industrial processes to produce the required shape and size for the pre-placed barrier material described herein.

In another exemplification, a specific variety of additive manufacturing may allow construction of a barrier of non-metallic material placed in the annular gap regions concurrently during the manufacturing process. Utilizing the powder bed fusion process of additive manufacturing it is possible to selectively control the material being placed during the build to construct a composite part which comprises both metallic inner and outer shaft regions separated by an intervening non-metallic material, or interlayer, where the annular gap spaces are intended. In either case, post-manufacture processing is required to remove the interlayer of material to form the desired annular void spaces.

Yet another feature or aspect of an exemplification of this invention is believed at the time of the filing of this patent application to possibly reside broadly in the use of an industrial process, such as ultrasonic obliteration which may be applied to effectuate the disintegration of the non-metallic barrier material which becomes encapsulated within and between the component parts of the assemblage at the sites of the annular gap spaces previously described above. By application of ultrasonic agitation directed at the constrained ceramic barrier material, either through mechanical contact with an industrial appliance provided for this purpose, e.g., ultrasonic sonicator probe, or by immersion of the entire assemblage in an ultrasonic bath, the captured barrier material may be disintegrated thereby facilitating its removal. Previously mentioned oil passages through the bearing journals of the outer cam lobe containing shaft are in communication with the interstitial annular gap regions and may be utilized to introduce a pressurized flow of flushing fluid to allow the disintegrated particles of the barrier material to escape and be swept away completely from within the assemblage. This method being technically feasible is similar to the common medical procedure of extracorporeal shockwave lithotripsy, or ESWL, which is a non-invasive procedure that provides high-intensity shock waves to the stone which cause the stone to fragment into smaller pieces, thereby allowing its removal by aspirating the fragments through a probe, while not harming the surrounding tissue.

At the time of this submission, the current state of the art of ceramic manufacturing does not support ready availability of a pre-constructed ceramic barrier material as described in the first exemplification above, i.e., in the shape of a hollow cylinder having a radial wall thickness which is thin enough to yield the desired minimal annular gap of 0.002-inch to 0.003-inch, after removal of the barrier material. In a search of industrial ceramics manufacturing companies such as Ortech Advanced Ceramics Incorporated, state of the art processes are capable of producing a nominally one-inch annular hollow cylinder, for example, having a minimum radial wall thickness on the order of 0.030-inch. This stated minimum wall thickness is an order of magnitude too large to yield the desired annular gap between the inner and outer camshafts of approximately 0.002-inch to 0.003-inch, as described above. Additionally, a pre-formed and pre-placed barrier material could not be used with the powder bed fusion process of manufacture as the technology relies on the sweeping of a wiper or roller to distribute the particles of material across each successive horizontal build layer, which would interfere with the a pre-placed barrier, as in the envisioned vertical cylinder. Therefore, further development toward the exemplified use of a pre-placed non-consumable barrier in the metal additive manufacturing process is required to reduce this concept to practice. However, where an interstitial gap can be sized according to the industrial capability to produce the ceramic barrier component, the process described herein may be used in other areas of the invention, or exemplifications thereof, or in other applications thereto.

This practical limitation on the ability to produce a pre-fabricated ceramic barrier component notwithstanding, the invention relies on use of the metal additive manufacturing process, or MAM, as exemplified generally in an object of the invention. And, as described above, as with composite part construction, and/or with functionally graded materials, or FGMs, illustrated in FIG. 3, the discretization of a ceramic material in the intended annular gap regions being placed concurrently during the MAM build sequence is technologically feasible using the power bed fusion process, and is therefore the preferred embodiment of this invention.

In another exemplification which does not rely upon the placement of a non-metallic barrier material to preserve the annular gaps spaces free of metal, the inner and outer shaft components exemplified herein may be practicably produced using a directed energy deposition process such as wire laser or electron beam metal deposition so long as the freely formed interstitial gaps are left large enough to allow discrete separation of the base material such that the co-located parts remain unbonded during and after construction. This material separation spacing is practicably understood to be on the order of tens of thousandths of an inch (e.g., 0.030 or more) with current technology, which is too large to maintain proper radial alignment tolerance between the inner and outer shafts owing solely to freely formed annular gaps, as intended by FIG. 3. Therefore, in another exemplification of the invention, shown on FIG. 4, the freely formed annular gaps may be enlarged to a radial width on the order of approximately 0.060-inch, which is within the resolution of the metal additive manufacturing process to discretize and preserve said annular void spaces of this magnitude during manufacture. In this exemplification, the void spaces being too large in and of themselves to maintain proper radial alignment between the inner and outer shafts, this space will require filling with a material that will then act as a plane bearing between the shafts, as in the prior object of maintaining a minimal clearance between the shafts so as to be self-aligning upon completion. Post-placement of said plane bearing material will require externally aligning the inner and outer shafts within the desired concentricity tolerance by a mechanical fixture for this purpose, then filling the annular space with a thermo-setting plastic, such as nylon, or a foundry metal such as bearing Babbitt, which has a lower melting point than the metal shaft components and which will not bond to the parent material. Also, the bearing material will be chosen to have a calibrated shrinkage rate which will exceed that of the surrounding base material upon solidification such that a small oil gap will exist between the plane bearing and at least one of the metal shafts to allow rotation and smooth operation. In this way the objective of the invention that there exists a small annular gap between the inner and outer shafts, as indicated in FIG. 3, now separated by a plane bearing, will be satisfied by the post-placement of the plane bearing material.

For this exemplification to be realized in practice, a material which has the desired amount of reduction in size during the solidification process should be chosen. In this manner, the magnitude of the residual annular gap can be calibrated to the desired width. For example, many polymer materials which would be suitable for use in this application, such as polyamide 66, or Nylon 66, with 30%-60% filler by weight, has a mold shrinkage value of 0.30 percent, ref: *Omnexus—The material selection platform*, at https://omnexus.specialchem.com/polymerproperties/properties/shrinkage #Definition. Thusly, in this exemplification, the diameter of the annular void space shown in FIG. 4 is on the order of the diameter of the inner shaft, from FIG. 3, plus two times the width of the radial gap as follows:

$$0.88\text{ inch}+2\times0.060\text{ inch}=1.00\text{ inch}$$

And, the nylon material exhibits a mold shrinkage rate of 0.30 percent; therefore, the diameter of the solidified plane bearing material will be the initial diameter minus the percent shrinkage rate times initial diameter, as follows:

$$1.00\text{ inch}-(0.003\times1.00\text{ inch})=0.997\text{ inch}$$

Thus, the solidified bearing material yields an annular gap between its outside diameter and the inside diameter of the outer shaft of 0.003 inch (i.e., 1.00 inch−0.997 inch), which meets the objective. As shown in FIG. 4, the cross drilled oiling holes will be utilized for injection of the thermo-setting material into the annular space, after which the holes will be cleaned out of residual material and then used to provide lubricating oil to the small final annular space between the plane bearing material and the outer shaft during opertion.

The invention embodied in the foregoing description includes the method for making said exemplifications by metal-additive-manufacturing process, or MAM, including an inner shaft containing an integral bank of cam lobes for operating the intake valves, and an outer hollow shaft containing an integral bank of cam lobes for operating the exhaust valves, or vice versa, whereby the azimuthal angle between the shafts and their contained banks of cam lobes may be varied over a small angle to accomplish variable timing between the intake and exhaust valves opening and closing events, the method for manufacture of said coaxial camshaft for variable valve timing comprising:

a. the making of an inner shaft constructed of contiguous material, wherein it is a single piece, containing a bank of cam lobes for operation of either the intake or exhaust valves, b. the making of an outer hollow shaft constructed of contiguous material, wherein it is a single piece, containing a bank of cam lobes for operation of either the intake or exhaust valves, c. the making of an axially aligned plunger having a radially projecting cross pin or pin protrusions as in journals which extend outward through slots contained in the walls of the inner shaft and outer shaft, wherein the cam lobes contained on the inner shaft may be either for operation of the intake or exhaust cam lobes, and where the cam lobes made on the outer shaft are the opposite of either the intake or exhaust cam lobes made on the inner shaft, wherein the inner shaft is made to be contained and captured within the outer shaft and made with cam lobes which project radially outward beyond the wall of the outer shaft through windows in the outer shaft provided for this purpose, wherein the plunger is made and placed to be contained within the inner diameter of the inner shaft and the plunger is made with a radial cross pin or pin projections as in journals which protrude outward through straight axially aligned slots made in the wall of the inner shaft and project further through helical slots made in the wall of the outer shaft, wherein the plunger may move axially with respect to the inner shaft and both axially and azimuthally with respect to the outer shaft according to the lead angle of the helical slots;

alternatively a cross pin or pin projections as in journals protrude outward through helical slots made in the wall of the inner shaft and project further through straight axially aligned slots made in the wall of the outer shaft, wherein axial translation of the plunger causes a reactive moment between the axial and helical slots of the corresponding shafts causing the outer shaft to rotate azimuthally relative to the inner shaft over a small angle.

Further including, the method of making said coaxial camshaft above wherein the plunger is made so that axial translation of the plunger causes the outer shaft to rotate azimuthally relative to the inner shaft, thereby allowing adjustment of the lobe centerline angle, or LCA, i.e., angle between the exhaust bank of cam lobes and intake bank of cam lobes, such that the timing of the opening of the intake valves is adjusted to occur prior to the complete closing of the exhaust valves such that both intake valves and exhaust valves are open simultaneously; a condition known as valve overlap.

Furthermore including, the method of making said coaxial camshaft above, which may be assembled to an internal combustion engine having also been fitted with an external means of adjusting the base angle between the crankshaft and the entirety of the coaxial camshaft; said angle being referenced between the crankshaft zero angle which occurs when the number one piston is at top dead center, and the camshaft zero angle which aligns with the mid-point of the LCA, so as to control the advance or retard angle of the camshaft, otherwise known as cam phasing, in addition to controlling the LCA, the two modes acting together resulting in universal variable valve timing, or VVT.

And yet further including, a method of making a coaxial camshaft built by the method of metal-additive-manufacturing, or MAM, comprised of making concentric inner and outer shafts which are, from the point in time of their initial formation, manufactured in the fully assembled configuration, and being separated only by the minimum gaps between said shafts necessary to allow the separation of material during the manufacturing process, thereby allowing the shafts to remain unbonded and allow rotation of the shafts and later passage of lubricant within said gaps.

Still further including, the method of making concentric shafts, whereby each shaft is individually made to be comprised of one solid piece of contiguous material, and which are neither made themselves of an assemblage of individual parts that are mechanically assembled and held together by mechanical means, nor are they made with sufficient clearance to allow insertion of one shaft into the other, nor are they made to be separable by means other than destructive disassembly.

Still further yet including, the method of making the concentric shafts which are simultaneously manufactured by MAM, and are made to be inextricably held together as the numerous protuberances of the inner shaft which are made to project radially outward through openings in the wall of the outer shaft and extending well beyond the outer diameter of the outer shaft thereby preventing axial movement of one shaft relative to the other, causing the inner shaft to be permanently constrained within the outer shaft.

In addition, the method of making concentric shafts while making purposefully controlled interstitial annular gap spaces between the outside diameter of the inner shaft and the inside diameter of the outer shaft, preferably at the sites coinciding with the locations of the exterior camshaft bearing journals, and remaining free of material during operation such that radial alignment between inner and outer shafts is carefully controlled, and allowing a thin film of lubricating oil to pass through the annular gaps during operation.

Further in addition, the method of using a barrier material occupying said interstitial annular gaps, composed of thermally resistant industrial ceramic which may be pre-placed or deposited concurrently by powder bed fusion process as an interlayer between the base material of the inner and outer shafts, and which is sized accordingly to reserve the desired interstitial gap space between the inner and outer concentric shafts free of deposited metal.

Furthermore in addition, the method of using a barrier material which is constrained from removal from the final manufactured assembly, but which may be removed by disintegration of the barrier material through application of ultrasonic vibration produced by an industrial sonicator probe, manufactured for this purpose, either by direct physical means or through immersion in an ultrasonic bath; alternatively, a barrier material which may be disintegrated and removed from within the interstitial spaces of the assemblage by introduction of the flow of pressurized flushing fluid via passages provided in the base material for the purposes of allowing oil flow during operation of the camshaft.

Still further in addition, the method wherein the concentric shafts having been made with purposefully controlled interstitial annular gaps between the outside diameter of the inner shaft and the inside diameter of the outer shaft, preferably at the sites coinciding with the locations of the exterior camshaft bearing journals, being sufficiently large so as to remain inherently free of material during wire laser, or electron beam, metal deposition process such that a post-placed injection molded bearing material, such as nylon or Babbitt, may be introduced in the annular space to maintain the radial alignment of the inner and outer shafts upon solidification of the bearing material.

Still furthermore in addition, the method wherein the concentric shafts with said large annular gaps are made, thereby permitting post-placement of a thermo-setting bearing material within the annular void space to serve as a plane bearing between said inner and out shafts, the material being selected with calibrated shrinkage rate so as to result in the desired minimal annular gap between the outer shaft and said bearing material upon solidification.

The components and methods disclosed in the patents, patent applications, patent publications, and other documents disclosed or incorporated by reference herein, may possibly be used in possible exemplifications of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one exemplification of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various exemplifications may be used with at least one exemplification or all of the exemplifications, if more than one exemplification is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, patent applications, patent publications, and other documents which are included in this application and which are referred to in paragraphs which state "Some examples of . . . which may possibly be used in at least one possible exemplification of the present application . . . " may possibly not be used or useable in any one or more exemplifications of the application.

The sentence immediately above relates to patents, patent applications, patent publications, and other documents either incorporated by reference or not incorporated by reference.

All of the references and documents cited in any of the patents, patent applications, patent publications, and other documents cited herein, except for the exceptions indicated herein, are hereby incorporated by reference as if set forth in their entirety herein except for the exceptions indicated herein. All of the patents, patent applications, patent publications, and other documents cited herein, referred to in the immediately preceding sentence, include all of the patents, patent applications, patent publications, and other documents cited anywhere in the present application.

Words relating to the opinions and judgments of the author of all patents, patent applications, patent publications, and other documents cited herein and not directly relating to the technical details of the description of the exemplifications therein are not incorporated by reference.

The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned words in this sentence, when not used to describe technical features of one or more exemplifications of the patents, patent applications, patent publications, and other documents, are not considered to be incorporated by reference herein for any of the patents, patent applications, patent publications, and other documents cited herein.

The description of the exemplification or exemplifications is believed, at the time of the filing of this patent application, to adequately describe the exemplification or exemplifications of this patent application. However, portions of the description of the exemplification or exemplifications may not be completely applicable to the claims as originally filed in this patent application, as amended during prosecution of this patent application, and as ultimately allowed in any patent issuing from this patent application. Therefore, any statements made relating to the exemplification or exemplifications are not intended to limit the claims in any manner and should not be interpreted as limiting the claims in any manner.

The details in the patents, patent applications, patent publications, and other documents cited herein may be considered to be incorporable, at applicant's option, into the claims during prosecution as further limitations in the claims to patentably distinguish any amended claims from any applied prior art.

While various aspects and exemplifications have been disclosed herein, other aspects and exemplifications are contemplated. The various aspects and exemplifications disclosed herein are for purposes of illustration and not intended to be limiting. Additionally, the words "including," "having," and variants thereof (e.g., "includes" and "has") as used herein, including the claims, shall be open-ended and have the same meaning as the word "comprising" and variants thereof (e.g., "comprise" and "comprises").

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the exemplification or exemplifications, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. § 1.72(b). As stated in 37 C.F.R. § 1.72(b):

> A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The exemplifications of the invention described herein above in the context of the preferred exemplifications are not to be taken as limiting the exemplifications of the invention to all of the provided details thereof, since modifications and variations thereof may be made without departing from the spirit and scope of the exemplifications of the invention.

LIST OF REFERENCES

U.S. patent Documents

| | | |
|---|---|---|
| 1,527,456 | Feb. 24, 1925 | Woydt et al. |
| 5,664,463 | Sep. 9, 1997 | Amborn et al. |
| 7,610,890 | Nov. 3, 2009 | Lettmann et al. |
| 7,228,829 B1 | Jun. 12, 2007 | Louie |
| 2010/0132640 A1 | Jun. 3, 2010 | Methley, Owen, Lawrence, Lancefiled |
| 11,621,544 B1 | Apr. 4, 2023 | Konig |
| 11,352,918 | Jun. 7, 2022 | Peila |

What is claimed is:

1. A concentric camshaft arrangement for an internal combustion engine with a plurality of intake valves and a plurality of exhaust valves, the concentric camshaft arrangement comprising:

- a hollow outer shaft formed as a single piece, the outer shaft including:
  - a first plurality of cam lobes respectively associated with one of the plurality of intake valves or the plurality of exhaust valves, and
  - a first set of slots formed on an inner periphery of the outer shaft, the first set of slots being one of axially extending slots or helical slots;
- an inner shaft formed as a single piece and concentrically arranged within the outer shaft, the inner shaft including:
  - a second plurality of cam lobes respectively associated with a remaining one of the plurality of intake valves or the plurality of exhaust valves, the second plurality of cam lobes configured to extend through respective windows of the outer shaft, and
  - a second set of slots extending through the inner shaft so as to be aligned with the first set of slots, the second set of slots being a remaining one of the axially extending slots or the helical slots; and
- a plunger concentrically arranged within a first end of the inner shaft, the plunger including a set of radial projections configured to extend through the second set of slots of the inner shaft and into the first set of slots of the outer shaft such that an axial translation of the plunger results in a rotation of the inner shaft relative to the outer shaft so as to adjust a phase of the second plurality of cam lobes relative to the first plurality of cam lobes,
- wherein the set of radial projections is defined by a radial cross pin or a set of pin projections, and
- wherein the inner shaft and the outer shaft are simultaneously manufactured via metal-additive-manufacturing (MAM) in a fully assembled configuration such that the inner shaft is prevented from being separated from the outer shaft without destructive disassembly.

2. The concentric camshaft arrangement of claim 1, wherein the axial translation of the plunger enables adjustment of valve overlap between the plurality of intake valves and the plurality of exhaust valves.

3. The concentric camshaft arrangement of claim 1, further comprising a variable valve timing (VVT) mechanism configured to adjust phase of the concentric camshaft arrangement relative to a crankshaft of the engine.

4. The concentric camshaft arrangement of claim 1, wherein during the manufacturing, the inner and outer shafts are separated by a minimum gap necessary to maintain the inner and outer shafts unbonded, the minimum gap configured to receive a lubricating oil which facilitates the rotation of the inner shaft relative to the outer shaft.

5. The concentric camshaft arrangement of claim 4, wherein the minimum gap is formed with insufficient clearance to enable insertion of the inner shaft into the outer shaft in a post-manufacturing assembly.

6. The concentric camshaft arrangement of claim 4, wherein upon completion of the manufacturing, the respective windows of the outer shaft constrain the second plurality of cam lobes such that (i) the inner shaft is prevented from moving axially relative to the outer shaft, and (ii) the inner shaft is enabled to rotate relative to the outer shaft within a predetermined angular range.

7. The concentric camshaft arrangement of claim 4, wherein at locations corresponding to exterior camshaft bearing journals, the inner and outer shafts are separated by interstitial annular gap spaces configured to receive the lubricating oil so as to control radial alignment between the inner and outer shafts during operation.

8. The concentric camshaft arrangement of claim 7, wherein during the manufacturing, a barrier material composed of thermally resistant industrial ceramic is pre-placed or deposited concurrently via a powder bed fusion process within the interstitial annular gap spaces as an interlayer between a base material of the inner and outer shafts, the barrier material being sized accordingly so as to reserve the interstitial annular gap spaces free of deposited metal.

9. The concentric camshaft arrangement of claim 8, wherein after the manufacturing, the barrier material is disintegrated via:

- an industrial sonicator probe configured to apply ultrasonic vibration via direct physical means or through immersion in an ultrasonic bath, or
- a flow of pressurized flushing fluid applied via lubricating oil passages formed in the base material.

10. The concentric camshaft arrangement of claim 7, wherein during the manufacturing, a bearing material is injection molded into the interstitial annular gap spaces so as to maintain the radial alignment of the inner and outer shafts, the bearing material including nylon or Babbitt.

11. The concentric camshaft arrangement of claim 10, wherein a thermo-setting bearing material is placed within the interstitial annular gap spaces so as to serve as a plane bearing between the inner and outer shafts, the thermo-setting bearing material including a calibrated shrinkage rate so as to result in the minimum gap between the inner and outer shafts.

12. A method of making the concentric camshaft arrangement of claim 1, the method comprising:

- simultaneously making the inner and outer shafts via metal-additive-manufacturing (MAM) in the fully assembled configuration, the inner and outer shafts being separated by a minimum gap necessary to maintain the inner and outer shafts unbonded and enable the rotation of the inner shaft relative to the outer shaft.

13. The method of claim 12, wherein each shaft is formed as a single piece of contiguous material, and wherein the minimum gap is formed with insufficient clearance to (i) enable insertion of the inner shaft into the outer shaft in a post-manufacturing assembly, or (ii) enable a separation of the inner shaft from the outer shaft without destructive disassembly.

14. The method of claim 12, wherein the respective windows of the outer shaft constrain the second plurality of cam lobes such that (i) the inner shaft is prevented from moving axially relative to the outer shaft, and (ii) the inner shaft is enabled to rotate relative to the outer shaft within a predetermined angular range.

15. The method of claim 12, wherein at locations corresponding to exterior camshaft bearing journals, the inner and outer shafts are separated by interstitial annular gap spaces configured to receive a lubricating oil so as to control radial alignment between the inner and outer shafts during operation.

16. The method of claim 15, further comprising inserting a barrier material within the interstitial annular gap spaces, the barrier material composed of thermally resistant industrial ceramic which is pre-placed or deposited concurrently by a powder bed fusion process as an interlayer between a base material of the inner and outer shafts, and the barrier material being sized accordingly so as to reserve the interstitial annular gap spaces free of deposited metal.

17. The method of claim 16, further comprising, after the making of the inner and outer shafts, disintegrating the barrier material via:

an industrial sonicator probe configured to apply ultrasonic vibration via direct physical means or through immersion in an ultrasonic bath, or a flow of pressurized flushing fluid applied via lubricating oil passages formed in the base material.

18. The method of claim 15, further comprising injection molding a bearing material into the interstitial annular gap spaces so as to maintain the radial alignment of the inner and outer shafts, the bearing material including nylon or Babbitt.

19. The method of claim 18, further comprising placing a thermo-setting bearing material within the interstitial annular gap spaces so as to serve as a plane bearing between the inner and out shafts, the thermo-setting bearing material including a calibrated shrinkage rate so as to result in the minimum gap between the inner and outer shafts.

* * * * *